United States Patent [19]

Soga

[11] Patent Number: 6,021,111
[45] Date of Patent: Feb. 1, 2000

[54] UNIT SWITCHING APPARATUS WITH FAILURE DETECTION

[75] Inventor: Kenji Soga, Tokyo, Japan

[73] Assignee: NEC Corporation, Tokyo, Japan

[21] Appl. No.: 08/761,225

[22] Filed: Dec. 6, 1996

[30] Foreign Application Priority Data

Dec. 7, 1995 [JP] Japan .................................. 7-318681

[51] Int. Cl.⁷ .................................................. H04B 1/74
[52] U.S. Cl. .......................... 370/221; 370/217; 370/244; 340/825.01; 340/825.16; 379/279; 714/2
[58] Field of Search ..................................... 370/221, 217, 370/244, 216, 242, 252, 465; 395/182.09, 181, 182.01, 182.02, 182.08, 182.11; 340/825.01, 825.06, 825.16; 379/258, 268, 279; 1/1; 714/11, 2, 3, 4, 10, 13

[56] References Cited

U.S. PATENT DOCUMENTS

| | | | |
|---|---|---|---|
| 4,393,493 | 7/1983 | Edwards | 340/825.01 X |
| 4,455,645 | 6/1984 | Mijioka et al. | 340/825.01 X |
| 5,311,170 | 5/1994 | Wachi et al. | 340/825.01 |
| 5,343,464 | 8/1994 | Iino et al. | 340/825.01 X |
| 5,343,477 | 8/1994 | Yamada | 395/182.02 |
| 5,638,358 | 6/1997 | Hagi | 340/825.01 |
| 5,771,225 | 6/1998 | Iino | 370/217 |

FOREIGN PATENT DOCUMENTS

| | | |
|---|---|---|
| 0 644 664 A2 | 9/1994 | European Pat. Off. .......... H04B 1/74 |
| 4-291828 | 10/1992 | Japan . |
| 2 244 628 | 4/1991 | United Kingdom ............ H04L 12/28 |

*Primary Examiner*—Michael Horabik
*Assistant Examiner*—William H. Wilson, Jr.
*Attorney, Agent, or Firm*—Foley & Lardner

[57] ABSTRACT

A unit switching apparatus includes first and second current units, a spare unit, and a switching unit. Each of the current units includes a communication circuit for performing communication in accordance with set operation mode data and a failure detection circuit for detecting and notifying occurrence of a failure in the communication circuit. The spare unit includes a communication circuit for performing communication in accordance with set operation mode data, a memory for separately storing the operation mode data set in the communication circuits of the current units, and a CPU for, when the occurrence of the failure is notified by the failure detection circuit, reading out the operation mode data corresponding to the faulty current unit from the memory, and setting the data in the communication circuit. The switching unit switches the faulty current unit to the spare unit when the occurrence of the failure is notified by the failure detection circuit.

15 Claims, 5 Drawing Sheets

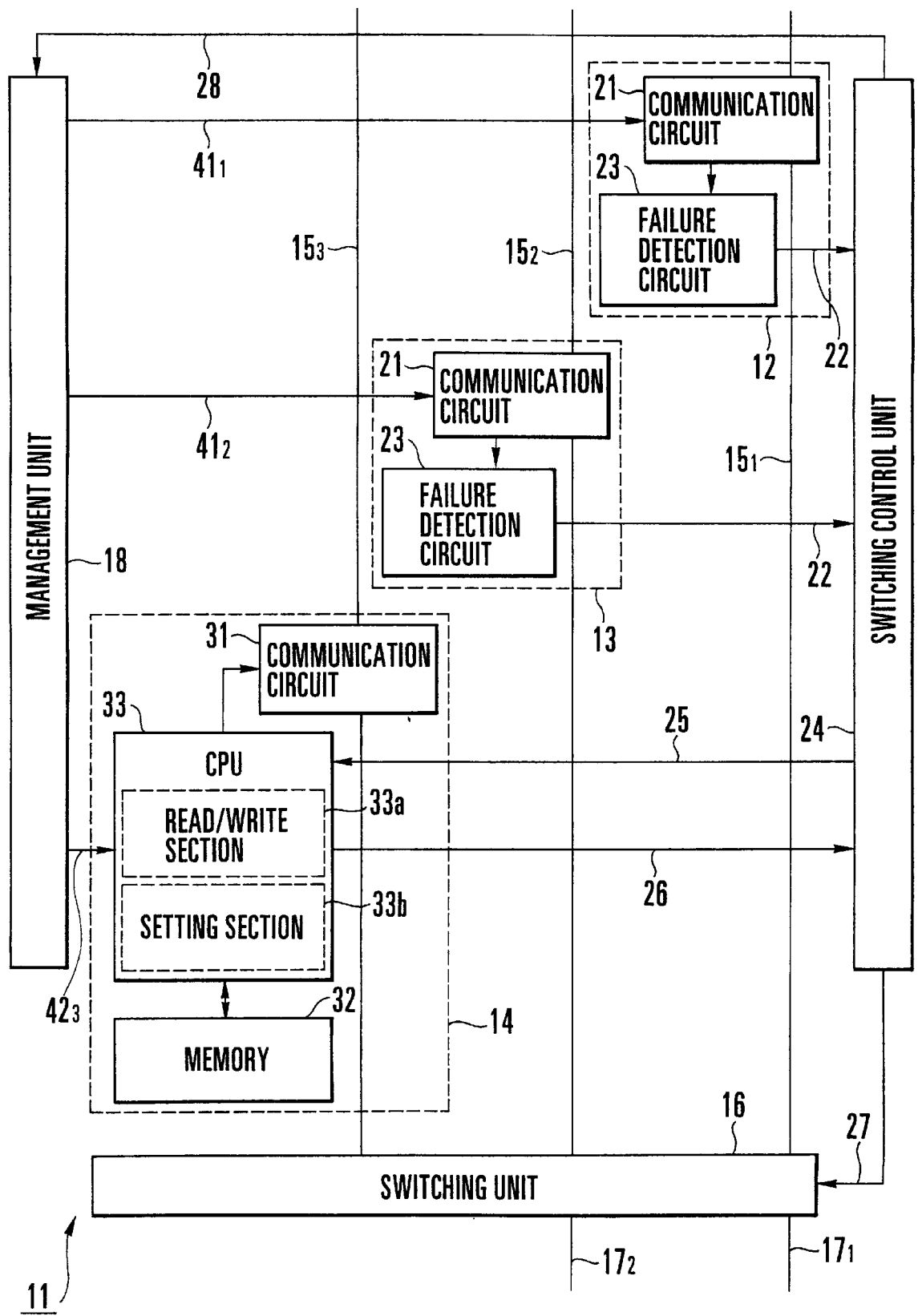
F I G. 1

UNIT SWITCHING APPARATUS WITH FAILURE DETECTION

BACKGROUND OF THE INVENTION

The present invention relates to a unit switching apparatus which includes a plurality of current-system communication units and a spare-system communication unit and switches to the spare-system communication unit if a failure occurs in any one of the current-system communication units and, more particularly, to a unit switching apparatus including communication units whose operation modes are set by setting data constituted by various parameters.

In a communication system, when a failure occurs in a communication unit, it is required that the normal operation be quickly restored. For this reason, the communication system includes a spare-system communication unit as well as current-system communication units. When the occurrence of a failure is detected in one of the current-system communication units, the faulty current-system communication unit is switched to the spare-system communication unit to shorten the interval during which communication is interrupted. In general, one spare-system communication unit is provided for a plurality of current-system communication units. Some communication units are designed to set their operation modes by using various parameters. When a failure occurs in such a communication unit, and the faulty communication unit is to be switched to the spare-system communication unit, the same setting data the faulty communication unit must be set in the spare-system communication unit.

FIG. 4 schematically shows the arrangement of a conventional unit switching apparatus. This apparatus includes a plurality of current-system communication units (to be referred to as current units hereinafter) 101 and a spare-system communication unit (to be referred to as a spare unit hereinafter) 102 for performing communication in place of a faulty current unit. A plurality of communication lines 103 through which communication signals are transmitted are connected to a switching unit 104 through the current units 101 and the spare unit 102. The switching unit 104 is a switching circuit for switching between the faulty current unit 101 and the spare unit 102.

A management unit 105 is a circuit for setting operation modes by sending various setting data 106 to the current units 101 and the spare unit 102. Each current unit 101 has a failure detection circuit for detecting the occurrence of a failure and outputting an alarm signal 107. The alarm signal 107 output from each current unit 101 is input to a switching control unit 108 for controlling a switching operation for each current unit 101 and the spare unit 102. The switching control unit 108 discriminates the faulty current unit on the basis of the alarm signal 107, and outputs a switching control signal 109 indicating the occurrence of the failure and the faulty current unit to the switching unit 104. The switching control unit 108 also outputs a failure notification signal 111 to the management unit 105.

The management unit 105 recognizes the faulty current unit in accordance with the failure notification signal 111, and makes the same setting as that of the faulty unit with respect to the spare unit 102. Upon reception of the failure notification signal 111, the management unit 105 also sends, to the switching control unit 108, a switching permission signal 112 indicating the completion of the preparation for switching to the spare unit 102.

FIG. 5 shows the sequences of the respective signals exchanged between the units in the unit switching apparatus in FIG. 4. Referring to FIG. 5, the vertical lines, when viewed from the left, respectively correspond to the management unit 105, the switching control unit 108, the current unit 101, the spare unit 102, and the switching unit 104. Assume that a failure has occurred in the current unit 101 at the time point indicated by an arrow 121. In this case, the failure detection circuit (not shown) of the current unit 101 outputs the alarm signal 107 to notify the switching control unit 108 of the occurrence of the failure. The switching control unit 108 sends the failure notification signal 111 indicating the occurrence of the failure and the faulty current unit to the management unit 105.

The management unit 105 sends the same setting data 106 the faulty current unit to the spare unit 102, thereby setting the spare unit 102 in the same operation mode as that of the faulty current unit 101. After the setting for the spare unit 102 is completed, the management unit 105 sends the switching permission signal 112 to the switching control unit 108. Upon reception of this signal, the switching control unit 108 sends, to the switching unit 104, the switching control signal 109 indicating that switching from the faulty current unit 101 to the spare unit 102 is performed. As described above, when a failure occurs in the current unit 101, switching from the faulty current unit 101 to the spare unit 102 is performed after the management unit 105 sets the operation mode in the spare unit 102.

A unit switching apparatus designed to shorten the time required to switch to the spare unit in the event of a failure is disclosed in Japanese Patent Laid-Open No. 4-291828. In this apparatus, when the same operation mode is set in a plurality of current units, the same operation mode is also set in the spare unit in advance. Since the overall arrangement of the conventional apparatus disclosed in the above reference is the same as that shown in FIG. 4, the arrangement of this apparatus will be described in detail below with reference to FIG. 4.

FIG. 6 shows the sequences of the respective signals exchanged within the above conventional unit switching apparatus in which the same operation mode as that in each current unit is set in the spare unit in advance. Referring to FIG. 6, similar to FIG. 5, the vertical lines, when viewed from the left, respectively correspond to a management unit 105, a switching control unit 108, a current unit 101, a spare unit 102, and a switching unit 104. In this apparatus, in place of the switching permission signal 112 in the unit switching apparatus shown in FIG. 3, a setting data coincidence signal 131 indicating that the setting data in all the current units 101 are the same is sent from the management unit 105 to the switching control unit 108.

When the settings in the current units 101 are the same, the management unit 105 sends the same setting data each current unit 101 to the spare unit 102 to set the same operation mode in advance. When each current unit 101 is started, the management unit 105 sends, to the switching control unit 108, a setting data coincidence signal 131 indicating that the setting data in all the current units 101 are the same. Assume that a failure has occurred in the current unit 101 at the time point indicated by an arrow 132. The failure detection circuit (not shown) of the current unit 101 outputs an alarm signal 107 to notify the switching control unit 108 of the occurrence of the failure.

Since the switching control unit 108 has received the setting data coincidence signal 131 indicating that the setting in the spare unit 102 is completed, the unit 108 sends, to the switching unit 104, a switching control signal 109 indicating that switching from the faulty current unit 101 to the spare unit 102 is performed. At the same time, the switching control unit 108 sends a failure notification signal 111 indicating the occurrence of the failure and the faulty current unit to the management unit 105.

As described above, when the setting data in all the current units 101 are the same, the spare unit 102 is set in the same operation mode as that of each current unit 101. For this reason, after a failure occurs, no setting data needs to be sent from the management unit 105 to the spare unit 102. With this operation, the switching time is shortened. Assume that the setting data in all the current units 101 are not the same. In this case, after a failure occurs, the same setting data as that for the faulty current unit 101 is sent from the management unit 105 to the spare unit 102, as in the case shown in FIG. 4.

According to the conventional technique disclosed in Japanese Patent Laid-Open No. 4-291828, when the setting data in all the current units 101 are the same, switching to the first current unit 12 can be performed within a short period of time. If, however, the setting data in the current units 102 are different from each other, setting data from the management unit 105 must be written in the spare unit 102 after a failure occurs. If, therefore, the setting data in all the current units 101 are not the same, it takes time to perform switching to the spare unit 102.

SUMMARY OF THE INVENTION

It is an object of the present invention to provide a unit switching apparatus which can set a spare unit with the same setting as that of a faulty current unit within a short period of time.

In order to achieve the above object, according to the present invention, there is provided a unit switching apparatus comprising a plurality of first communication units of a current system, each of the first communication units including first communication means for performing communication in accordance with a set operation mode data and failure detection means for detecting and notifying an occurrence of a failure in the first communication means, a second communication unit of a spare system including second communication means for performing communication in accordance with a set operation mode data, storage means for separately storing the set operation mode data of the first communication means of the first communication units, and setting control means for, when the occurrence of the failure is notified by the failure detection means, reading out the set operation mode data corresponding to the faulty first communication unit from the storage means, and setting the set operation mode data in the second communication means, and unit switching means for switching the faulty first communication unit to the second communication unit when the occurrence of the failure is notified by the failure detection means.

BRIEF DESCRIPTION OF THE DRAWINGS

FIG. 1 is a block diagram showing the schematic arrangement of a unit switching apparatus according to the first embodiment of the present invention;

DESCRIPTION OF THE PREFERRED EMBODIMENTS

Figure 2:
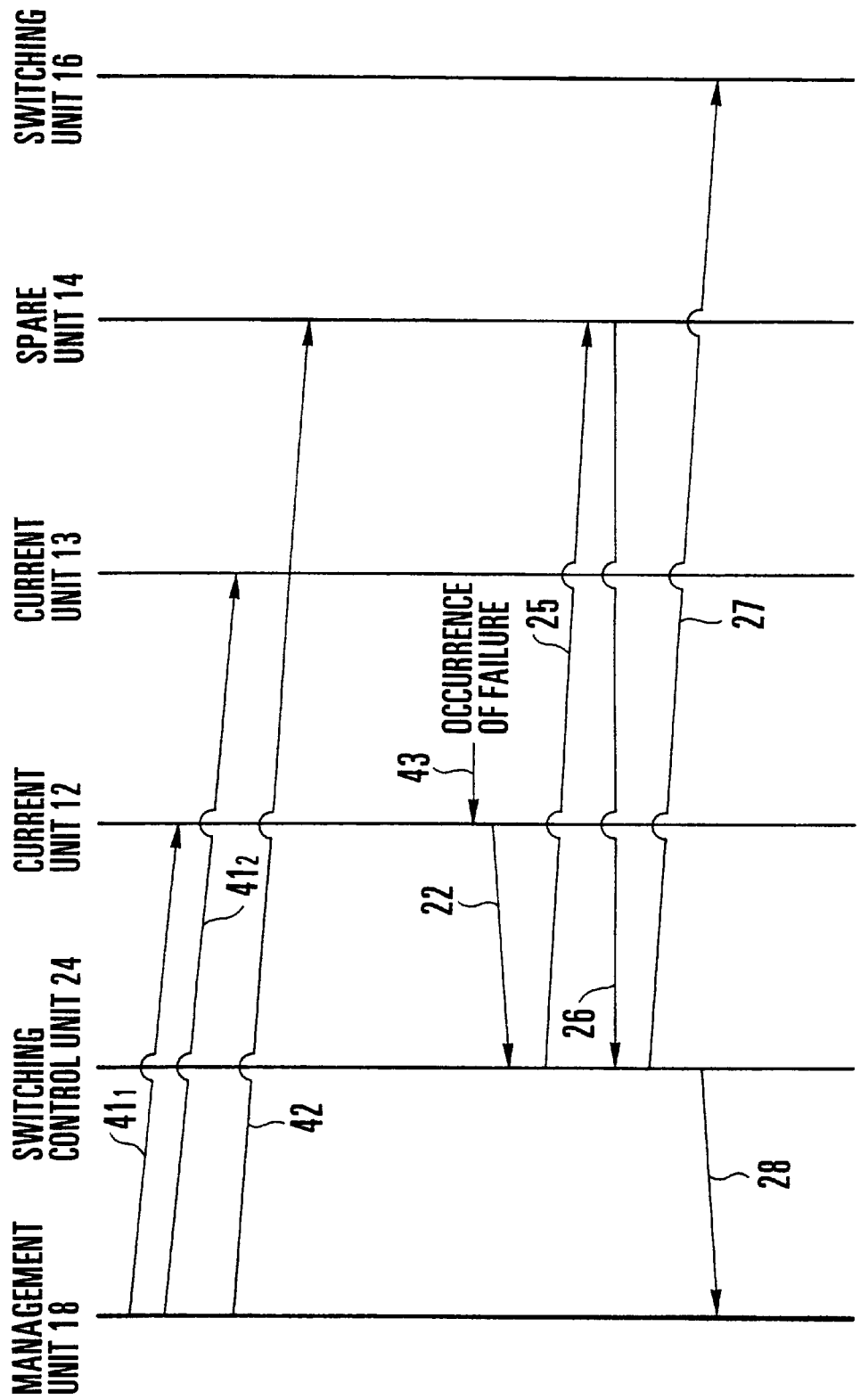
FIG. 2 is a view showing the sequences of various signals in the unit switching apparatus of FIG. 1.

FIG. 1 shows the schematic arrangement of a unit switching apparatus according to the first embodiment of the present invention. A unit switching apparatus 11 includes first and second current units 12 and 13 as current-system communication units and a spare unit 14 as a spare-system communication unit. Communication lines $15_1$ to $15_3$ are connected to a switching unit 16 through the current units 12 and 13 and the spare unit 14. The switching unit 16 is a circuit for switching between the faulty current unit 12 or 13 and the spare unit 14. Two of the communication lines $15_1$ to $15_3$ are selected to be connected to output lines $17_1$ to $17_2$ through the switching unit 16.

A management unit 18 sets operation modes for the current units 12 and 13 on the basis of setting data $41_1$ and $41_2$, and sends setting data 42 containing the setting data $41_1$ and $41_2$ set in the current units 12 and 13 to the spare unit 14. Each of the current units 12 and 13 includes a communication circuit 21 for performing a communication operation and a failure detection circuit 23 for detecting the occurrence of a failure in the communication circuit 21 and outputting an alarm signal 22. The alarm signal 22 output from each of the current units 12 and 13 is input to a switching control unit 24 for controlling a switching operation for the current units 12 and 13 and the spare unit 14.

The switching control unit 24 discriminates the faulty current unit on the basis of the alarm signal 22, and outputs a faulty unit notification signal 25 indicating the occurrence of the failure and the faulty current unit to the spare unit 14. Upon reception of the faulty unit notification signal 25, the spare unit 14 can recognize the occurrence of the failure and the faulty current unit. In addition, a switching permission signal 26 indicating the completion of the preparation for a switching operation is input from the spare unit 14 to the switching control unit 24. The switching control unit 24 also outputs, to the switching unit 16, a switching control signal 27 indicating that switching from one of the current units 12 and 13 to the spare unit 14 is performed, and the faulty current unit. In addition, a failure notification signal 28 indicating that a failure has occurred and switching from the faulty current unit to the spare unit has been performed is input from the switching control unit 24 to the management unit 18.

The spare unit 14 includes a communication circuit 31 for performing a communication operation and a memory 32 for storing setting data indicating the operation modes of the current units 12 and 13 and sent from the management unit 18. The spare unit 14 also includes a CPU (Central Processing Unit) 33 which has a read/write section 33a for reading/writing data from/in the memory 32 and a setting section 33b for setting the setting data for the communication circuit 31, and serves as a setting control means for performing various types of processing. Setting data 42 from the management unit 18 and the faulty unit notification signal 25 and the switching permission signal 26 from/to the switching control unit 24 are input/output to/from the CPU 33 through an input/output port (not shown).

The operation of the unit switching apparatus having the above arrangement will be described next.

FIG. 2 shows the sequences of the respective signals exchanged in the unit switching apparatus 11. Referring to FIG. 2, the vertical lines, when viewed from the left, respectively correspond to the management unit 18, the switching control unit 24, the first current unit 12, the second current unit 13, the spare unit 14, and the switching unit 16. The management unit 18 sends different setting data $41_1$ and $41_2$ to the first and second current units 12 and 13 to set operation modes. In this case, the first and second setting data $41_1$ and $41_2$ are respectively sent to the first and second current units 12 and 13 to set them in different operation modes. In addition, the management unit 18 sends the setting data 42 containing the first and second setting data $41_1$ and $41_2$ to the spare unit 14.

The first and second current units 12 and 13 directly set the setting data $41_1$ and $41_2$, sent from the management unit 18, in their respective communication circuits 21. The CPU 33 of the spare unit 14 stores the setting data 42, received from the management unit 18, in the memory 32 in correspondence with the current units 12 and 13. In this manner, the initial setting for the operation mode is performed when the system is started.

Assume that a failure has occurred in the first current unit 12 at the time point indicated by an arrow 43. The failure having occurred in the communication circuit 21 of the first current unit 12 is detected by the failure detection circuit 23. The failure detection circuit 23 of the first current unit 12 sends the alarm signal 22 indicating the occurrence of the failure to the switching control unit 24. Upon reception of the alarm signal 22, the switching control unit 24 discriminates the faulty current unit, and sends the faulty unit notification signal 25 indicating the occurrence of the failure and the faulty unit to the spare unit 14.

In the spare unit 14, the read/write section 33a of the CPU 33 reads out the setting data corresponding to the current unit indicated by the received faulty unit notification signal 25 (the setting data $41_2$ corresponding to the first current unit in this case) from the memory 32. The setting section 33b sets the readout setting data $41_2$ in the communication circuit 31. After the setting of the communication circuit 31 is completed, the CPU 33 sends the switching permission signal 26 to the switching control unit 24. Upon reception of the switching permission signal 26, the switching control unit 24 sends, to the switching unit 16, a switching control signal 27 indicating that switching from the faulty first current unit 12 to the spare unit 14 is performed. In accordance with the instruction from the switching control signal 27, the switching unit 16 performs switching from the faulty first current unit 12 to the spare unit 14. Finally, the switching control unit 24 sends, to the management unit 18, a failure notification signal 28 indicating that switching from the faulty first current unit 12 to the spare unit 14 is performed.

As described above, since the setting data $41_1$ and $41_2$ set in the current units 12 and 13 are stored in the memory 32 of the spare unit 14 in advance, the setting data in the faulty current unit need not be transferred from the management unit 18 to the spare unit 14 after the failure has occurred. With this operation, the time required for switching to the spare unit 14 is shortened.

Figures 3A, 3B:
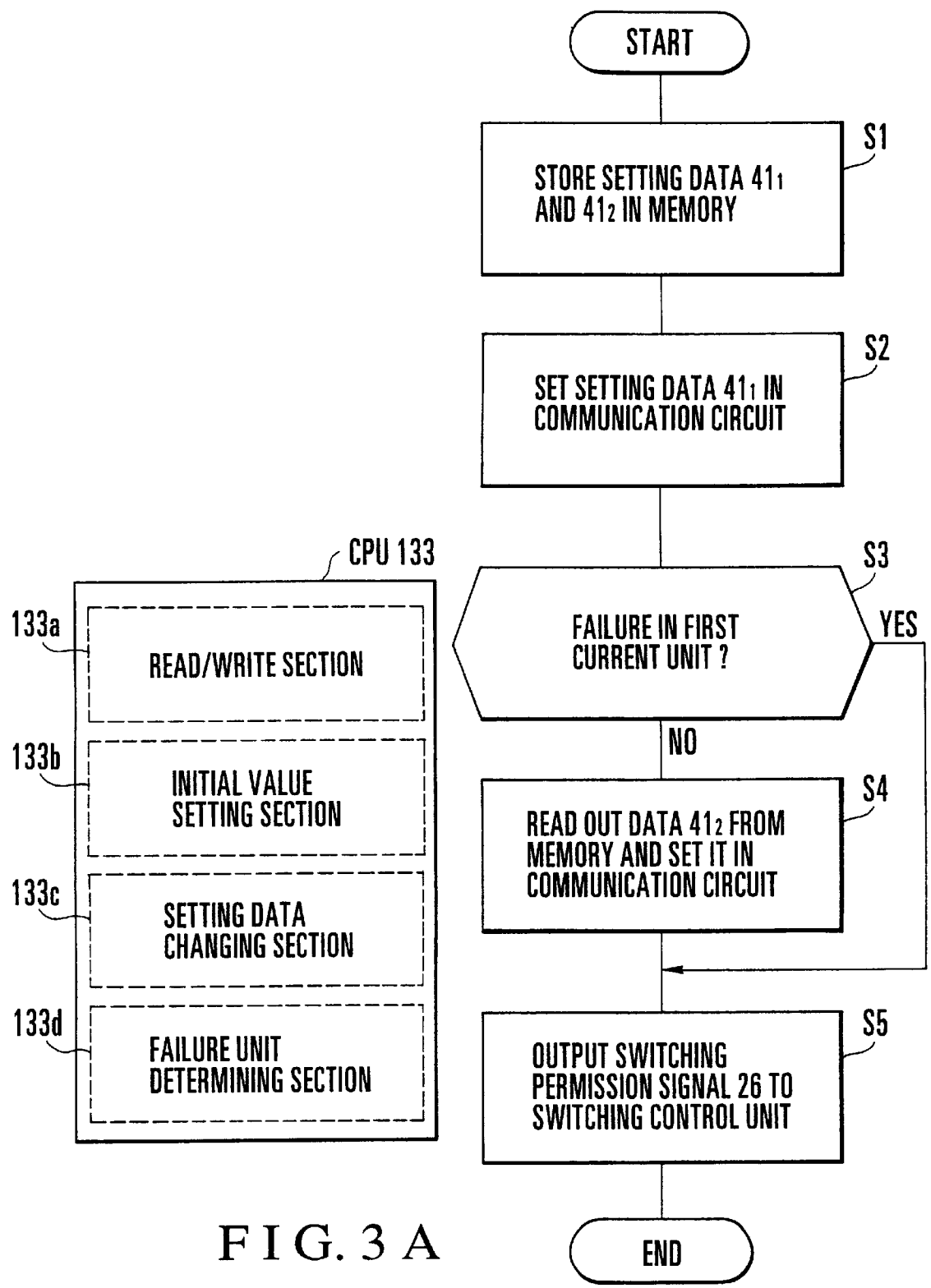
FIG. 3A is a block diagram showing the CPU of the spare unit in a unit switching apparatus according to the second embodiment of the present invention.
FIG. 3B is a flow chart showing the control operation of the CPU in FIG. 3A.
Figure 4:
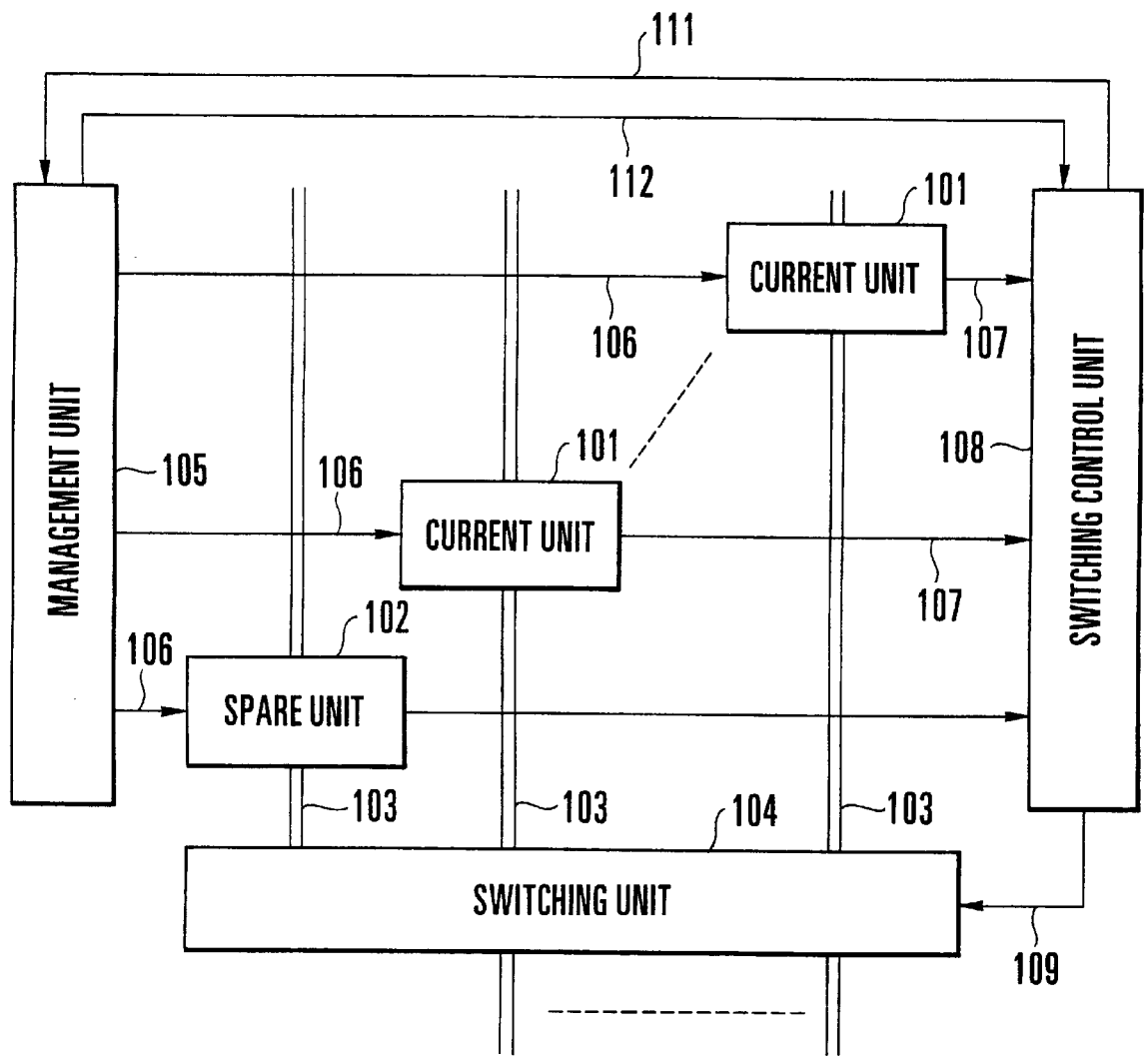
FIG. 4 is a block diagram showing the schematic arrangement of a conventional unit switching apparatus.
Figure 5:
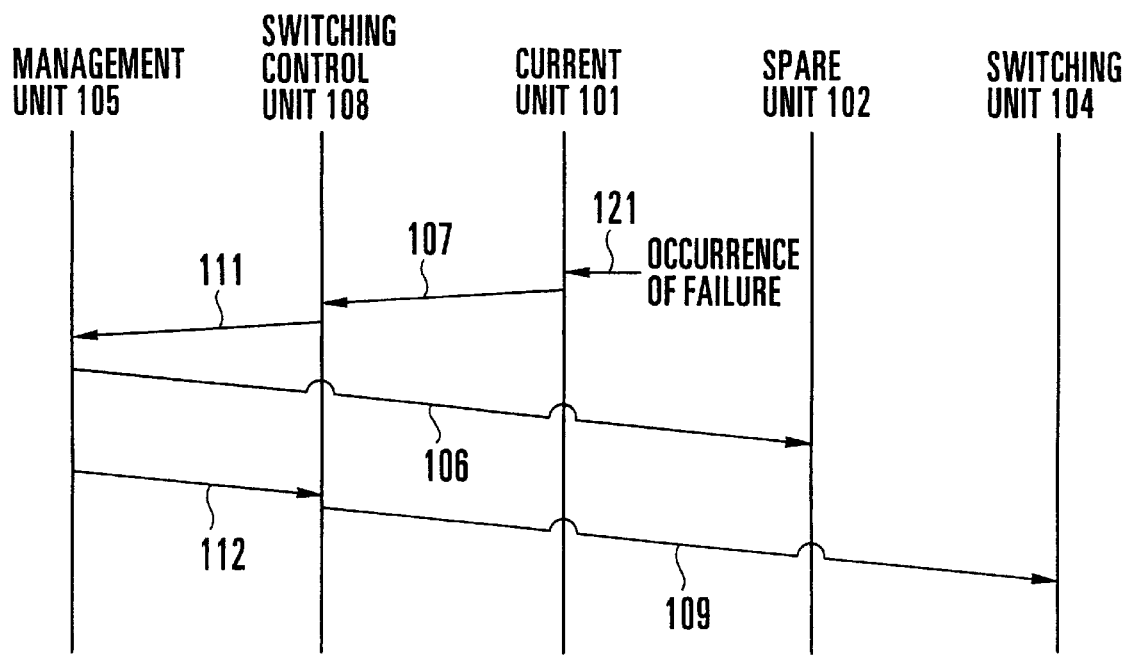
FIG. 5 is a view showing the sequences of the various signals exchanged in the conventional unit switching apparatus in FIG. 4.
Figure 6:
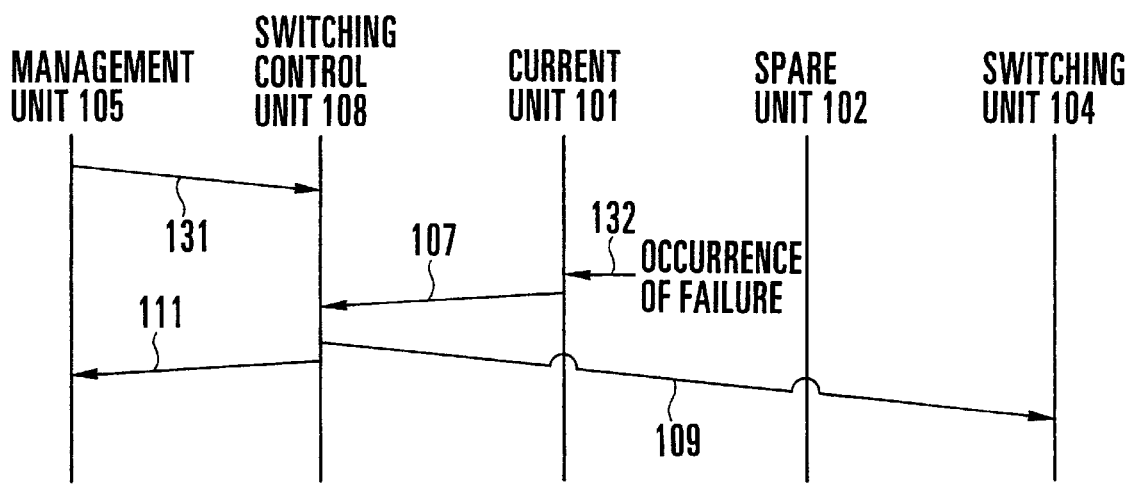
FIG. 6 is a view showing the sequences of various signals in another conventional unit switching apparatus.

FIG. 3A shows the CPU of the spare unit in the second embodiment of the present invention. FIG. 3B shows the control operation of the CPU in FIG. 3A. The arrangement shown in FIG. 3A is the same as that shown in FIG. 1 except that the CPU 33 of the spare unit 14 is replaced with a CPU 133. The second embodiment will be described below with reference to FIGS. 1, 3A, and 3B. As shown in FIG. 3A, the CPU 133 is constituted by a read/write section 133a for reading/writing setting data from/in a memory 32, an initial value setting section 133b for setting one of the setting data $41_1$ and $41_2$ as an initial value in a communication circuit 31 in advance, a setting data changing section 133c for changing the setting data set as the initial value, and a failure unit determining section 133d for determining on the basis of a faulty unit notification signal 25 whether the setting data as the initial value is the setting data corresponding to the faulty unit.

In the unit switching apparatus of this embodiment, one of the setting data $41_1$ and $41_2$ for current units 12 and 13 is set as the initial value in the communication circuit 31 of the spare unit 14 in advance. When the setting data $41_1$ and $41_2$ for the first and second current units 12 and 13 are sent from a management unit 18, the read/write section 133a of the CPU 133 separately stores the setting data $41_1$ and $41_2$ in the memory 32 (step S1). The initial value setting section 133b sets the setting data $41_1$ for the first current unit 12 as the initial value in the communication circuit 31 (step S2). Thereafter, upon reception of the faulty unit notification signal 25 from a switching control unit 24, the failure unit determining section 133d checks whether the first current unit 12 in which the corresponding setting data is set as the initial value is the faulty unit (step S3). When the faulty unit notification signal 25 indicates that the faulty unit is the second current unit 13, the setting data $41_1$ set as the initial value is different from the setting data $41_2$ for the second current unit in which the failure has occurred. For this reason, the read/write section 133a reads out the setting data $41_2$ for the second current unit 13 from the memory 32, and the setting data changing section 133c sets the readout setting data $41_2$ in the communication circuit 31, thereby changing the setting of the operation mode of the spare unit 14 (step S4). Upon completion of the setting of the operation mode, the CPU 133 sends a switching control signal 26 to the switching control unit 24 (step S5).

If it is determined in step S3 that the faulty unit indicated by the faulty unit notification signal 25 is the first current unit 12, since the data set as the initial value coincides with the setting data for the faulty unit, the CPU 133 immediately sends the switching permission signal 26 to the switching control unit 24 without changing the operation mode (step S5). If the setting data for one of the current units is set as an initial value in this manner, and the setting data set as the initial value coincides with the setting data for the faulty current unit, the time required for switching from the faulty current unit to the spare unit can be further shortened.

In the above embodiments and modification, for the sake of descriptive convenience, the number of current units is set to be two. As is apparent, however, the number of current units may be three or more. In addition, the switching permission signal 26 is returned from the spare unit 14 to the switching control unit 24 after the setting data read out from the memory 32 is set in the communication circuit 31. However, if the time required to read out setting data from the memory 32 and set the readout setting data in the memory 32 is relatively short, the switching control unit 24 may output a switching control signal 27 to a switching unit 16 without waiting for the switching permission signal 26. If the operation modes set in the current units 12 and 13 are fixed, these operation modes may be stored in the spare unit 14 in advance without sending the setting data 42 from the management unit to the spare unit 14. For example, in place of the memory 32, a ROM in which the setting data 41₁ and 41₂ for the current units are stored in advance may be arranged in the spare unit 14.

As described above, according to the present invention, since the operations set in the respective communication units are stored in the spare unit, no setting data needs to be sent from the management unit to the spare unit in the event of a failure. The time required for switching can therefore be shortened.

In addition, since the operation mode for each communication unit set by the operation mode setting means, and the operation mode notified by the operation mode setting means is stored in the spare unit, this apparatus can flexibly cope with changes of the operation modes for the respective communication units.

Furthermore, the operation mode for one of the communication units is set as an initial value in the spare communication means of the spare unit, and the operation mode for the spare communication means is changed only when the setting data for the faulty communication unit differs from the initial value. With this operation, when the setting data for the faulty communication unit coincides with the initial value, the operation mode for the spare communication means need not be changed, thereby shortening the time required for switching.

What is claimed is:

1. A unit switching apparatus comprising:

a plurality of current communication units, each of said current communication units including first communication means for performing communication in accordance with an operation mode data, and failure detection means for detecting and notifying of a failure occurrence in said first communication means;

a spare communication unit including second communication means for performing communication in accordance with an operation mode data, storage means for storing the operation mode data set in the first communication means of said plurality of current communication units, and control means for reading out from said storage means the operation mode data corresponding to a faulty, current communication unit having a failure occurrence in its first communication means and setting the read out data in said second communication means; and unit switching means for switching from the faulty communication unit having the failure occurrence to said spare communication unit when the failure occurrence is notified by said failure detection means of the faulty communication unit, wherein said control means comprises initial value setting means for setting the operation mode data that is set in one of said current communication units, as an initial value in said second communication means of the spare communication unit, determination means for determining whether said one of said current communication units coincides with said faulty communication unit when the failure occurrence is notified by said failure detection means of the faulty communication unit, read means for reading out the operation mode data of said faulty communication unit from said storage means when the determination means indicates non-coincidence, and setting data changing means for setting the data read out by said read means in said second communication means.

2. The apparatus according to claim 1, wherein said control means comprises read means for reading out the operation mode data corresponding to said faulty communication unit from said storage means when the failure occurrence is notified by said failure detection means of the faulty communication unit, and setting means for setting the operation mode data read out by said read means in said second communication means.

3. The apparatus according to claim 1, further comprising management means for setting different operation mode data in said first communication means of said current communication units, and outputting the operation mode data set in said first communication means to said spare communication unit, wherein said control means of said spare communication unit stores the data that is output from said management means in said storage means.

4. The apparatus according to claim 1, further comprising switching control means for outputting a faulty unit notification signal to said control means of said spare communication unit when the failure occurrence is notified by said failure detection means of the faulty communication unit, and also outputting a switching control signal to said switching means, said control means setting the operation mode data that is read out from said storage means in said second communication means in accordance with the faulty unit notification signal from said switching control means.

5. The apparatus according to claim 4, wherein said control means of said spare communication unit returns a switching permission signal to said switching control means after the operation mode data is set in said second communication means, and said switching control means outputs the switching control signal to said switching means in response to the switching permission signal from said control means.

6. The apparatus according to claim 4, wherein said switching control means outputs the faulty unit notification signal to said control means of said spare communication unit and, at the same time, outputs the switching control signal to said switching means.

7. The apparatus according to claim 1, wherein said control means outputs a signal for permitting a switching operation of said switching means when said setting data changing means completes setting the operation mode data or when said determination means indicates coincidence.

8. A unit switching apparatus comprising:

a plurality of communication units, at least one of which is a spare communication unit, each communication unit connected to a communication line for performing a communication operation in accordance with an operation mode data set therein;

a management unit for setting the operation mode data in the non-spare communication units and supplying the operation mode data set in every non-spare communication unit to the spare communication unit;

a switching unit connected to the communication units and to a plurality of output lines for connecting the spare communication unit to one of the output lines in place of a faulty, non-spare communication unit that failed to perform the communication operation; and a control unit for receiving a failure occurrence signal from the faulty communication unit and supplying a faulty unit notification signal to the spare communication unit to indicate which of the non-spare communication units is the faulty communication unit, wherein the operation mode data set in the faulty communication unit is set in the spare communication unit upon receipt of the faulty unit notification signal, and wherein the spare communication unit includes a storage section in which the operation mode data set in the non-spare communication units are stored, the operation mode data set in the faulty communication unit being retrievable from the storage section for setting in the spare communication unit when the faulty communication unit fails to perform the communication operation.

9. The apparatus according to claim 8, wherein the switching unit connects the spare communication unit to one of the output lines in place of the faulty communication unit in response to a control signal from the control unit.

10. The apparatus according to claim 9, wherein the spare communication unit supplies a switching permission signal to the control unit when the operation mode data set in the faulty communication unit is retrieved from the storage section and set in the spare communication unit, and the control unit supplies the control signal to the switching unit upon receipt of the switching permission signal.

11. The apparatus according to claim 8, wherein the operation mode data set in one of the non-spare communication units is set in the spare communication unit.

12. A method of communicating through a plurality of communication units, one of which is a spare communication unit, wherein each communication unit performs a communication operation in accordance with an operation mode data set respectively therein, the method comprising the steps of:

supplying the operation mode data to be set in the non-spare communication units to the communication units, each of the non-spare communication units receiving a respective one of the operation mode data and the spare communication unit receiving every one of the operation mode data received by the non-spare communication units;

setting the respective one of the operation mode data in each of the non-spare communication units;

storing the operation mode data received by the spare communication unit in a storage unit of the spare communication unit; and selectively connecting the communication units to a plurality of output lines, wherein, upon failure of a faulty, non-spare communication unit, the operation mode data corresponding to the faulty, non-spare communication unit is retrieved from the storage unit of the spare communication unit for setting in the spare communication unit, and the spare communication unit is connected to one of the output lines in place of the faulty, non-spare communication unit, wherein the step of setting includes the sub-step of setting the operation mode data set in one of the non-spare communication units in the spare communication unit, and wherein, upon failure of the faulty, non-spare communication unit, the operation mode data retrieved from the storage section is compared with the operation mode data already set in the spare communication unit and the operation mode data set in the spare communication unit is replaced with the retrieved operation mode data if the retrieved operation mode data is different from the operation mode data already set in the spare communication unit.

13. The method according to claim 12, wherein, upon failure of the faulty, non-spare communication unit, the operation mode data corresponding to the faulty, non-spare communication unit is retrieved and set in the spare communication unit.

14. The method according to claim 13, further comprising the steps of:

issuing a failure occurrence signal when the faulty communication unit fails to perform the communication operation; and issuing a faulty unit notification signal in response to the failure occurrence signal, the faulty unit notification signal indicating which of the non-spare communication units failed to perform the communication operation, wherein the step of retrieving and setting the operation mode data corresponding to the faulty, non-spare communication unit is initiated in response to the faulty unit notification signal.

15. The method according to claim 14, further comprising the step of:

issuing a switching permission signal upon completion of the step of retrieving and setting the operation mode data corresponding to the faulty, non-spare communication unit, wherein the step of selectively connecting is initiated in response to the switching permission signal.

* * * * *